United States Patent [19]

Lynch et al.

[11] Patent Number: 4,486,214
[45] Date of Patent: Dec. 4, 1984

[54] METHODS OF AND APPARATUS FOR COLLAPSING A PREFORM TUBE INTO A PREFORM FROM WHICH LIGHTGUIDE FIBER IS DRAWN

[75] Inventors: Brian Lynch, Norcross, Ga.; John B. MacChesney, Lebanon, N.J.; Fred P. Partus, Marietta, Ga.; Jay R. Simpson, Fanwood, N.J.

[73] Assignees: AT&T Technologies, Inc., New York, N.Y.; AT&T Bell Laboratories, Murray Hill, N.J.

[21] Appl. No.: 559,603

[22] Filed: Dec. 8, 1983

[51] Int. Cl.³ ............................................. C03C 25/02
[52] U.S. Cl. ........................................ 65/3.12; 65/2; 65/13; 427/163
[58] Field of Search ............................. 65/2, 3.12, 3.2

[56] References Cited

U.S. PATENT DOCUMENTS 4,087,266  5/1978  Irven et al. ................................. 65/2
4,121,919  10/1978  LeSergeont et al. ................. 65/13 X
4,302,230  11/1981  MacChesney et al. ............. 65/3.12

*Primary Examiner*—Robert Lindsay
*Attorney, Agent, or Firm*—E. W. Somers

[57] ABSTRACT

A lightguide fiber preform is made by depositing optically suitable layers of doped silicon dioxide on an inner wall of a rotating glass substrate tube (31) which is exposed to a moving zone of heat during a deposition mode and during a mode when the tube is collapsed. During each of a plurality of passes of a torch assembly (50) in the collapse mode following deposition, a contact device (101) is in continuous engagement with the tube and is caused to apply forces to each successive increment of its length following exposure to at least an initial portion of the zone of heat to collapse incrementally the tube. Between successive ones of the plurality of passes, the contact device is moved inwardly of the tube so that each increment of length is exposed to forces which as between the successive passes are applied at points incrementally closer to the longitudinal axis (36) of the tube.

26 Claims, 10 Drawing Figures

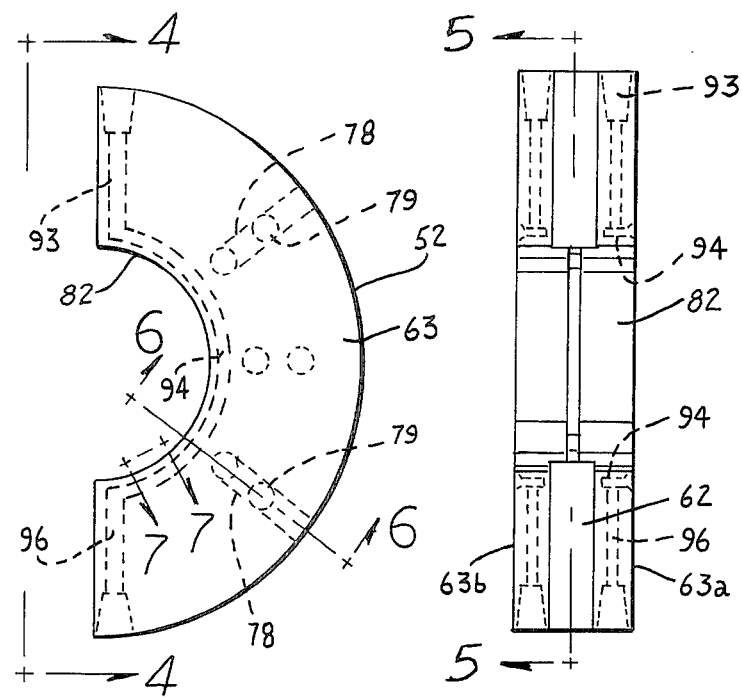
Fig_3   Fig_4
Fig_9
Fig_8

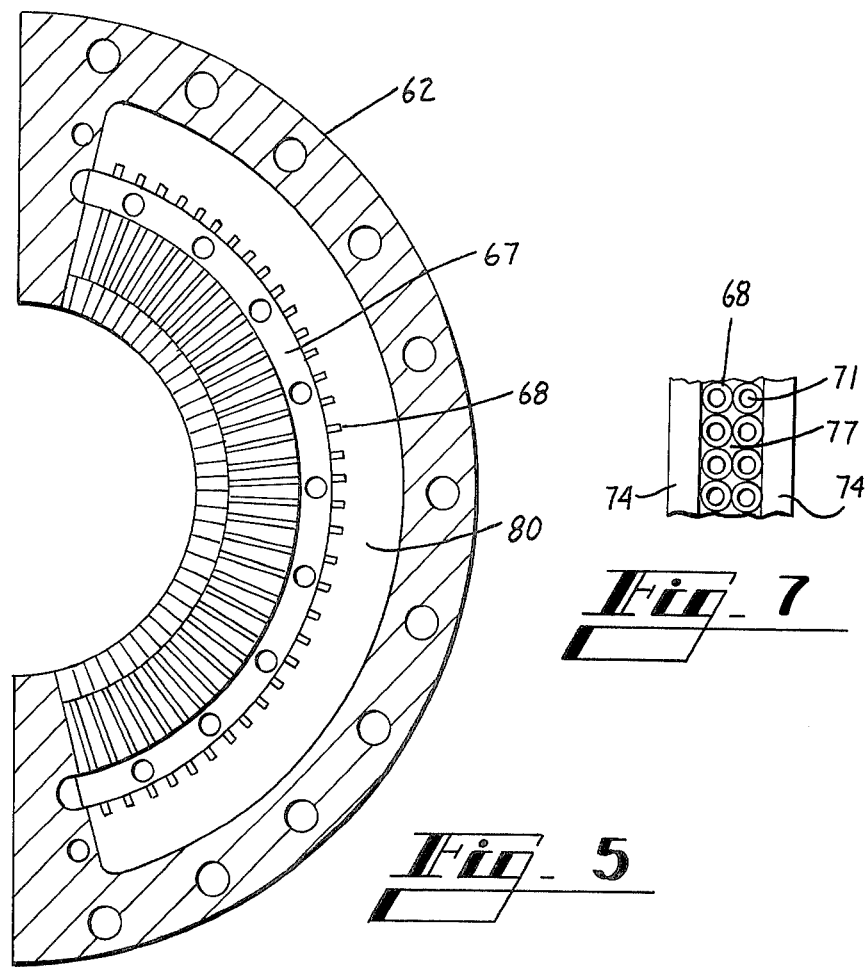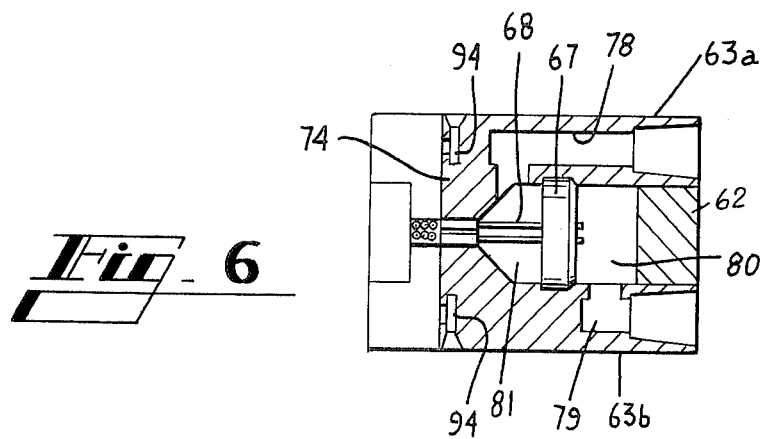

METHODS OF AND APPARATUS FOR COLLAPSING A PREFORM TUBE INTO A PREFORM FROM WHICH LIGHTGUIDE FIBER IS DRAWN

TECHNICAL FIELD

This invention relates to methods of and apparatus for collapsing an elongated glass tube. More particularly, it relates to methods of and apparatus for causing a preform tube to be collapsed about an axis which extends between its ends to provide a rod-like preform from which lightguide fiber is drawn.

BACKGROUND OF THE INVENTION

There are several different techniques for producing a lightguide fiber for use in communications. One such technique comprises directing a constantly moving stream of reactants and oxygen through a glass substrate tube having a generally circular cross-section. The oxygen stream carries silicon tetrachloride and dopants to produce the desired index of refraction in the finished lightguide fiber. The substrate glass is heated to a reaction temperature within a moving hot zone that traverses the length of the tube, and the consequent reaction produces doped silicon dioxide fused into a continuous layer on the inner wall of the tube. The resulting tube is referred to as a preform tube.

A torch assembly for heating a glass substrate tube to facilitate deposition is described in U.S. Pat. No. 4,231,777 which issued on Nov. 4, 1980, in the names of B. Lynch and F. P. Partus. See also U.S. Pat. No. 4,401,267 which issued on Aug. 30, 1983 in the name of C. D. Spainhour. Initially, one end of the tube is supported in the headstock of a lathe and the other end is welded to an exhaust tube that is supported in the tailstock. Combustible gases are directed through a housing and nozzles of the torch assembly and toward the tube as it is turned rotatably about its longitudinal axis and as the torch assembly is moved therealong on a carriage to produce a moving hot zone. A temperature profile is produced across the hot zone which moves along on the surface of the tube, with a peak value sufficient to accomplish the desired reaction and deposition. See F. P. Partus and M. A. Saifi "Lightguide Preform Manufacture" beginning at page 39 of the Winter 1980 issue of the *Western Electric Engineer*.

During a deposition mode, the torch carriage moves slowly from the headstock of the lathe where dopants are moved into the glass tube to the tailstock where gases are exhausted. At the end of each pass from headstock to tailstock, the torch carriage is returned rapidly to the headstock for the beginning of another cycle. The ends of the nozzles adjacent to the tube are cooled to eliminate substantially degradation by oxidation or reduction, for example, of the material forming the housing and nozzles. In one embodiment of this technique, an rf plasma is established in the tube to enhance certain processes in reaction and deposition. See for example, U.S. Pat. No. 4,331,462 which issued on May 25, 1982 in the names of J. W. Fleming, Jr., J. B. MacChesney and P. B. O'Connor. See also U.S. Pat. No. 4,262,035.

Subsequent to the deposition mode, a collapse mode is used to cause the preform tube to become a solid rod-like member which is called a preform. It is this preform from which lightguide fiber is drawn. See D. H. Smithgall and D. L. Myers "Drawing Lightguide Fiber" beginning at page 49 of the hereinbefore identified Winter 1980 issue of the *Western Electric Engineer*. The process of collapsing a preform tube may consume as much time as three and one-half hours. In order to collapse the preform tube, the torch assembly is moved in a number of passes from tailstock to headstock. The temperature of the moving hot zone which is higher during the collapse mode than during the deposition mode softens the tube wall and allows surface tension to cause the tube to collapse into a rod.

What is needed and what is not provided by the prior art are methods and apparatus for collapsing, in a relatively short period of time, a preform tube into a preform from which lightguide fiber is drawn. Inasmuch as the collapse mode is performed on the same lathe which is used during deposition, reduced time for collapse will enhance the production of preform tubes. Seemingly, the prior art has not addressed this problem.

SUMMARY OF THE INVENTION

The foregoing problem has been overcome by the methods and apparatus of this invention. A method of collapsing an elongated glass tube includes the steps of supporting the tube at its ends for rotation about a longitudinal axis thereof. Each successive increment of length of the tube is exposed to a zone of heat having a temperature profile by causing relative motion between the zone of heat and the tube while the tube is being rotated. As the tube is rotated, it is collapsed into a solid preform by applying forces to the tube in a reproducible manner and continuously during each of a plurality of passes. The forces are applied to successive increments of length of the tube at a distance as measured along the length of the tube after each successive increment has been exposed to at least an initial portion of the zone of heat. The point of application of the forces to each increment as between successive ones of the plurality of passes becomes incrementally closer to the longitudinal axis of the tube.

In the manufacture of a preform tube from which lightguide fiber is drawn, a substrate tube, having a generally circular cross-section, is supported rotatably at its ends. The substrate tube is turned rotatably and heated to an initial temperature while doped reactants are deposited in the tube to form a predetermined profile. During deposition, the temperature of the tube is reduced from the initial temperature as the number of passes increases. Then, the outer surface of the tube is heated to a temperature within a range which is higher than the initial temperature by a moving zone of heat and the tube is collapsed in accordance with the foregoing method. Forced collapse of the tube in accordance with the methods of this invention does not affect adversely the strength properties of the drawn fiber.

In an apparatus for collapsing an elongated glass preform tube having a circular cross-section and a deposited core, facilities are provided for holding ends of the tube to allow rotation about its longitudinal axis. The apparatus includes a torch for heating the preform tube. Relative motion is caused between a zone of heat which is produced by the torch and the preform tube in a plurality of passes to cause successive increments of length of the tube to be heated while it is turned rotatably. A contact device adjacent to the torch is moved into engagement with the tube at the beginning of each of a plurality of passes. Relative motion between the contact device and the tube causes sufficient forces to be applied to the successively heated increments of length of the tube on successive occasions to cause the increments to become collapsed about the longitudinal axis into a solid rod. An internal pressure may be used to maintain the circularity of the tube. The engagement of the contact device with each increment of the preform tube occurs at a point within the zone of heat such that the tube is capable of being collapsed without any stress cracking in the tube or deposited core. The arrangement of the contact device is such that as between predetermined passes it is moved manually or by a controlled feedback loop closer to the longitudinal axis of the tube.

BRIEF DESCRIPTION OF THE DRAWINGS

Other features of the present invention will be more readily understood from the following detailed description of specific embodiments thereof when read in conjunction with the accompanying drawings, in which:

FIG. 3 is a side elevational view of a surface mix torch assembly which includes a plurality of nozzles;

FIG. 4 is an end view of the torch assembly of FIG. 3 taken along lines 4—4;

FIG. 5 is an elevational view in section of the torch assembly shown in FIG. 4 and taken along lines 5—5 thereof;

FIG. 6 is a detail view of a portion of the torch assembly shown in FIG. 3 and taken along lines 6—6 thereof;

FIG. 7 is an end view of a portion of the torch assembly of FIG. 3 along lines 7—7 thereof;

FIG. 8 is a front elevational view of a tailstock end of a lathe and an exhaust tube;

FIG. 9 is a front elevational view of an alternative embodiment of an exhaust tube retainer at the tailstock end of the glass tube.

DETAILED DESCRIPTION

Figure 1:
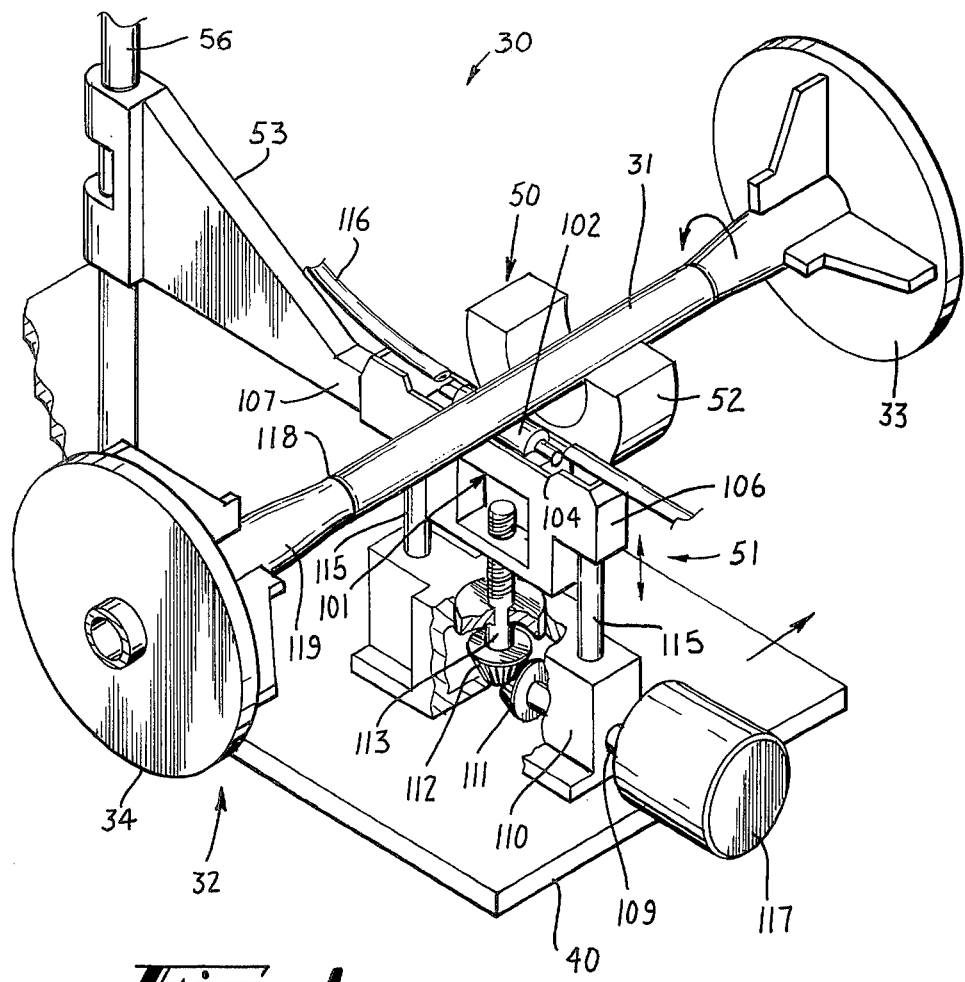
FIG. 1 is a perspective view of an apparatus of this invention which includes a torch assembly for heating a glass tube and a device for collapsing the glass tube into a preform rod.

Referring now to FIG. 1 there is shown an apparatus, designated generally by the numeral 30, for heating and collpasing a glass tube 31 to manufacture a solid silica glass preform from which a lightguide fiber is drawn. During a deposition made, a substrate tube 31 is heated in order to cause the reaction products of gases and/or dopants being fed into the tube to be fused to the inside wall thereof to provide a preform tube having an optically suitable profile for communications use. In this description, the numeral 31 is used to designate both the substrate tube and the preform tube. The heating of the glass tube 31 is carried out while gas phase reactants are delivered to the tube. A system for this delivery is disclosed in U.S. Pat. No. 4,276,243 which issued on June 30, 1981, in the name of F. P. Partus.

Figure 2:
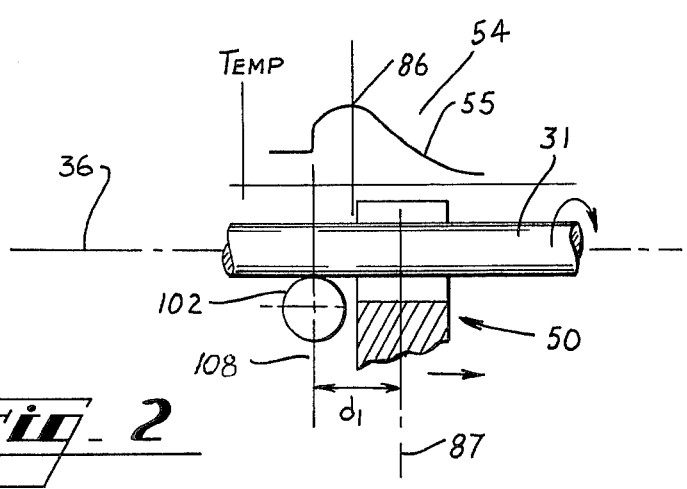
FIG. 2 is an enlarged view of a portion of the torch assembly, a portion of the collapsing device and a temperature profile across a zone of heat which traverses the tube.

The apparatus 30 generally comprises a lathe 32 having a headstock 33 and a tailstock 34 which are used to support the glass starting tube 31 for rotation about its longitudinal axis 36 (see FIG. 2). The lathe 32 also includes a carriage 40 which is mounted for reciprocal movement along the lathe. Mounted on the carriage 40 is a torch assembly which is designated generally by the numeral 50 and a collapsing device which is designated 51.

The torch assembly 50 is adapted to cause a flow of combustible gases to produce flames which are directed toward the tube 31. By confining the heat from the burning gases to a desired surface area of the tube, the torch assembly 50 establishes a zone of heat 54 (see FIG. 2) having a temperature profile 55 at the surface of the tube. The mounting of the torch assembly 50 on the carriage 40 and its movement relative to the tube 31 causes the zone of heat, which is referred to as a hot zone, to be moved along the length of the tube. The torch assembly 50 includes a housing 52 supported by a bracket 53 which is supported from a post 56 that is mounted on the carriage 40. Through adjustment of the bracket 53, the torch assembly 50 may be moved within any one of a range of distances from the tube 31 or to any one of a plurality of positions about and spaced from the tube. The capability of adjusting the torch relative to the tube 31 in a transverse direction aids in the control of the temperature profile along successive portions of the tube as the torch assembly moves along the length of the rotating tube during a deposition mode.

As shown in FIGS. 3-6, the housing 52 of the torch assembly 50 includes a center section 62 which is disposed between two cover plates 63a-63b. A plurality of radially disposed gas nozzles 68—68 extend through and are supported by a bridge wall 67. Each includes a passageway 71 (see FIG. 7). Each of the cover plates 63a-63b includes a semi-annular lip 74 (see FIG. 6) which extends toward the nozzles 68—68 so that the nozzles are clamped effectively between the opposing lips. Openings 77—77 (see again FIG. 7) are formed between the ends of the nozzles and between the ends of the nozzles and the lips 74—74. The housing 52 includes a plurality of tunnels 78—78 which communicate with a supply hydrogen gas and a plurality of tunnels 79—79 that are connected externally to a supply of oxygen gas.

When assembled as shown in FIGS. 3 and 6, the cover plates 63a-63b cooperate with the center section 62 to form an outer cavity 80 and an inner cavity 81. The outer cavity 80 opens to the tunnels 79—79 so that the supply of oxygen flows into the cavity 80 and then into the nozzles 68—68. The cavity 81 communicates with the tunnels 78—78 so that hydrogen flows into the cavity 81 and thence outwardly through the openings 77—77. The bridge wall 67 functions to separate the two cavities 80 and 81 and to prevent any interaction between the two combustible gases.

In the torch assembly 50, the oxygen and the hydrogen are moved through and about the nozzles 68—68 and are mixed generally along an arcuate surface 82 (see FIGS. 3-4) to produce flames which impinge on the tube 31. The distance between the tube 31 and the arcuate surface 82 of the torch assembly 50 to which the nozzles 68—68 open is generally in the range of about 1.8-2.0 cm. This distance may vary as between the deposition and collapse modes of the preform manufacture.

The flows which are emitted to the surface 82 result in flames which provide a temperature profile that facilitates the deposition of doped silicon dioxide, for example, on the inner surface of the tube 31 and collapse. The torch assembly 50 produces a zone of heat 54 (see FIG. 2) with temperatures ranging about 1600° C. during deposition to over 2000° C. during a collapse mode. The zone of heat 54 is a length of the tube 31 along which the temperature profile is formed by the torch assembly 50 as it passes along the tube. As can be seen in FIG. 2, the zone of heat 54 extends ahead of the torch assembly 50 and behind it. Because the torch assembly 50 moves along the tube 31, a maximum temperature 86 within the zone of heat trails a centerline 87 of the torch assembly 50. Accordingly, the zone of heat is said to trail the torch assembly. Assuming that no adjustment to gas flow controllers is made, the faster the torch assembly is moved, the greater the distance between the maximum temperature 86 of the heat zone and the centerline 87 of the torch assembly.

It is important for the housing 52 and the walls of the nozzles 68—68 to be cooled in order to provide a clean flame and to prevent oxidation and resulting flaking of material from the housing and the walls. A coolant, such as water, for example, is fed into each of two conduits 93—93 (see FIGS. 3 and 4) and directed through semi-annular channels 94—94 (see also FIG. 6). From the channels 94—94, the coolant moves into exit conduits 96—96 and out of the assembly 50 for recirculation.

The apparatus 30 includes facilities for collapsing the preform tube following deposition by either the MCVD or the plasma MCVD process, for example. The methods and apparatus of this invention decrease substantially the time required to collapse the tube 31. For example, the velocity of the torch achieved by the methods of this invention is about twice that used during the prior art technique of collapse by surface tension. As a result, collapse time is reduced by about 50%.

Going now to the collapsing device 51 of the apparatus 30, it is seen from FIG. 1 that a tube contact device 101 is positioned adjacent to the torch assembly 50. It is adapted to be moved in tandem with the torch assembly 50 in a number of passes along the length of the preform tube. The contact device 101 may be displaced from the torch assembly 50 in a circumferential direction about the tube. In a preferred embodiment, the contact device 101 includes a roller 102 which is made of graphite. The roller 102 is mounted rotatably in bearings 104—104 that are supported in a platform 106. The contact device may take other forms such as, for example, a metallic or ceramic tube or a non-rotatable graphite block.

As also can be seen in FIG. 1, the contact device 101 is mounted on the carriage 40, but could just as well be supported from the torch assembly 50 or from an arm 107 of the torch bracket 53. Further, it is positioned on the trailing side of the torch assembly 50 as defined in a collapse mode, and in an operated position in the preferred embodiment, is adjacent to the underside of the glass tube 31 which is destined to become the preform.

Parameters which are important to the forced collapse of the tube are the temperature of the glass within the zone of heat, the carriage speed and the position of the engagement of the roller 102 with the tube 31 relative to the zone of heat 54. The zone of heat is formed in the vicinity of the torch assembly as the torch passes along the tube 31, but, as will be recalled, it is usually not centered with respect to the centerline of the torch and trails it (see FIG. 2). The distance by which its maximum temperature 86 lags the torch assembly is a function of the velocity of the torch assembly; the greater the velocity, the greater the trailing distance. However, the maximum velocity at which the torch assembly can be moved and still provide sufficient heat to the tube to facilitate a forced collapse is dependent on and limited by the efficiency of the torch. The distance is also a function of the diameter of the tube 31 and its thickness. For a tube having an infinitely thin wall and relatively high conductivity, the maximum temperature 86 of the hot zone occurs at the torch centerline 87. Inasmuch as the tube 31 has a thickness and the torch assembly 50 is moving along the tube, the hot zone lags the torch assembly.

The contact device 101 must engage the glass tube 31 at a point where the glass can be moved in on itself. Inasmuch as the location of the hot zone is difficult to ascertain, the roller 102 may be referenced to the centerline 87 of the torch assembly 50. A distance $d_1$ (see FIG. 2) between the centerline 87 of the torch assembly 50 and the center axis 108 of the roller 102 is called the trailing distance and occurs where the increment of length of glass is soft enough to be collapsed without fracturing or surface stressing the tube 31 or deposited core. In a preferred embodiment for collapsing a preform tube for multimode lightguide fibers, the distance $d_1$ is on the order of 4.0 cm. Should the distance exceed an established range, the glass which is contacted by the roller 102 would be too cool to be collapsed successfully. Excessive amounts of burner gas may have to be used to compensate for the excessive spacing of the torch assembly 50 and the roller 102.

The distance $d_1$ is somewhat greater than that used to position the contact device for a straightening mode, such as is disclosed in copending application Ser. No. 388,561, filed June 12, 1982 in the names of B. Lynch and F. P. Partus. By increasing the distance, there is more exposure to the zone of heat 54 which allows some collapsing of the preform tube by surface tension. It has been found that too rapid a forced collapse may affect adversely the layered deposited structure within the preform tube 31.

The platform 106 is mounted for vertical movement. The vertical movement may be provided by a rack and pinion arrangement, a helical gear arrangement or a bevel gear arrangement as shown in FIG. 1, or other equivalent mechanism. In the bevel gear arrangement, a shaft 109 extends horizontally through a base 110 and has a beveled gear 111 attached to an inner end. The beveled gear 111 meshes with another beveled gear 112 which is attached to a lower end of a threaded shaft 113. The shaft 113 turns through a threaded bore of the platform 106 that supports the contact device 101. Two guide rods 115—115 extend vertically from the base 110 through bores in the platform 106. Rotation of the beveled gear 111 turns the beveled gear 112 which turns the threaded shaft 113. As the shaft 113 turns, the platform 106 is caused to be moved upwardly or downwardly therealong.

Vertical movement of the platform 106 and hence of the roller 102 may be controlled manually through a turnwheel (not shown) attached to an outer end of the shaft 109 or by a stepping motor 117 controlled through a feedback loop (not shown). In either arrangement, the roller 102 may be moved closer to the longitudinal axis 36 of the tube between predetermined passes such as, for example, successive passes.

In a preferred embodiment, the collapsing device 51 of the apparatus 30 includes facilities for causing the surface that engages the tube 31 to have a temperature that is substantially below that of the preform tube. The platform 106 is adapted to hold a coolant such as deionized water which may be supplied by tubes 116—116

(see FIG. 1). The water is applied over the surface of the roller 102 to clean the surface of the roller, which engages the tube 31. The water drains from the housing through a passageway (not shown) in the platform 106. While in the preferred embodiment, the roller 102 is surface-cooled, it has been found that a contact device which is cooled internally, for example, also can be used to collapse the preform tube.

In the manufacture of the preform with the apparatus 30, a glass tube 31 is positioned in the lathe with one of its ends in the headstock 33 and with its other end connected by a welded joint 118 (see FIG. 1) to an exhaust conduit 119. The exhaust conduit 119 is supported in the tailstock 34 of the lathe 32. The glass tube 31 is rotated as the torch assembly 50 is moved in a plurality of passes of a profiled velocity in a direction from the headstock 33 to the tailstock 34. During each pass, doped reactants are moved into the tube 31 from its headstock end while spent gases are exhausted at the tailstock end. For a description of methods and apparatus for exhausting these gases, see U.S. Pat. No. 4,278,459 which issued on July 14, 1981 in the name of F. P. Partus. Following deposition, the wall of the substrate tube which is now referred to as a preform tube is pinched adjacent to its tailstock end. This prevents the entry of moisture and other contaminants into the tube 31 while it is being collapsed.

Then the doped glass tube 31 is collapsed into a solid preform preparatory to drawing. In the preferred embodiment, the lathe 32 which is used during deposition is used during collapse to support the tube 31; however, the tube could be supported by other apparatus and could be oriented vertically. During the collapse mode, heating, at a higher temperature than during deposition, occurs as the torch assembly 50 is moved at another profiled velocity in a number of passes in a direction from the tailstock 34 to the headstock 33. At the end of each pass during the collapse mode, the carriage 40 is returned rapidly to the tailstock 34 for the beginning of another cycle. Although the direction of travel of the torch assembly 50 during the collapse mode in the preferred embodiment is opposite to that in the deposition mode, it may be the same. In that event, the tube 31 is not pinched off completely at the tailstock end in order to allow for the removal of gases. Otherwise, an undesirable pressure build-up in the tube could occur.

Prior to or during the first pass of the collapse mode, the graphite support roller 102 is moved upwardly to contact the rotating glass tube 31 and to apply forces thereto. As explained hereinbefore, this may be done manually or automatically. Its vertical position is a function of the tube diameter and of the velocity of the torch. The roller is pushed into the softened glass within the moving zone of heat as occurs at a predetermined distance behind the centerline 87 of the torch assembly 50. If necessary, the contact device 101 is effective to force the glass tube 31 into alignment with the centerline between the headstock 33 and the tailstock 34. Accordingly, the roller 102 is adapted to urge each successive increment of length of the tube 31 upwardly until it is disposed substantially concentrically about the centerline between the chucks of the lathe 32.

At the beginning of successive ones of predetermined passes, the roller 102 is moved farther inward toward the longitudinal axis 36 of the tube 31. For example, after the first pass, the carriage 40 is caused to be returned to the tailstock and the roller 102 caused to be moved farther toward the longitudinal axis 36 of the preform tube. In the preferred embodiment, this incremental movement of the roller 102 is repeated at the beginning of each successive pass of a plurality of passes during the collapse mode. As a result, the roller on each successive pass is disposed closer to the longitudinal axis 36 of the preform tube 31 than on each preceding pass. The collapse mode may include additional passes during which the roller 102 is not used to apply collapsing forces to the preform tube 31.

The engagement of the roller 102 with the tube 31 imparts a horizontal force component to the tube which is directed from the tailstock 34 to the headstock 33. This tends to cause the exhaust conduit 119 to which the tube 31 is welded to become loose in the chuck which would result in an unreconcilable offset or bowing of the tube. In order to prevent such slippage, a bead 121 (see FIG. 8) is formed on the exhaust conduit 119 adjacent to an outer side 122 of the chuck of the tailstock 34. As an alternative, a clamp 124 (see FIG. 9) is positioned about the exhaust conduit 119 adjacent to the outer side 122 of the tailstock chuck. Any forces imparted to the exhaust conduit 119 from tube 31 will be resisted by the engagement of the bead 121 or the clamp 124 with the chuck. A lathe having collet type chucks may not require these provisions for resisting the longitudinal forces imparted to the tube during collapse.

Each increment engaged by the roller 102 must be cool enough afterwards to retain its reconfiguration as the graphite roller 102 moves on to the next successive increment along the length of the tube. In the preferred embodiment, the water which is flowed over the graphite roller 102 provides a moving cold zone which helps to establish a set in the tube which is being collapsed incrementally.

The water cooling of the roller 102 also is helpful in preventing the roller from adhering to the glass tube 31. Further, the water is effective to flush and remove glass ablations, which are caused by heating the tube 31 at a relatively high temperature, from the surface of the graphite roller. Otherwise, the abaltions would accumulate and could become deposited on the graphite roller surface and eventually transferred and impressed into the glass by the roller, resulting in stress points in the preform tube and subsequent low strength fiber.

During collapse, a controlled positive pressure inside the tube 31 is of assistance in maintaining circularity as the tube is collapsed. This positive pressure is constant and is less than a predetermined value to avoid causing damange to the tube, particularly where the temperature of the outside surface of the tube 31 is a maximum. This is helpful in preventing the tube 31 from going flat or oval in the softened zone of the glass adjacent to the roller 102. As will be recalled, the tailstock end of the tube 31 is pinched off in a preferred embodiment prior to collapse to prevent the entry of contaminants. Although this is not necessary, it is helpful in maintaining the positive pressure inside the tube 31 to prevent the formation of any irregularities in the tube at the point of its engagement by the contact device 101.

Inasmuch as the preform tube includes deposited layers of chemicals throughout most of its length, high temperatures must be used to collapse the tube because of its modified wall thickness. During collapse, the temperature exceeds about 2000° C. which is substantially higher than the temperature of the outer surface of the substrate tube during sintering following deposition. At and adjacent to the ends of the tube where little or no deposits have been made, the same temperature at the same torch velocity may cause the tube to sag slightly and cause an offset when the graphite support is lowered. To prevent this, a programmed delay has been incorporated into the carriage return pass after the torch oxygen has been vented. This allows the surface of the tube 31 to cool sufficiently while it is still supported by the roller 102, after which the contact device 101 is lowered for the return pass. In the alternative, the torch velocity may be ramped up as the torch approaches the ends.

Figure 10:
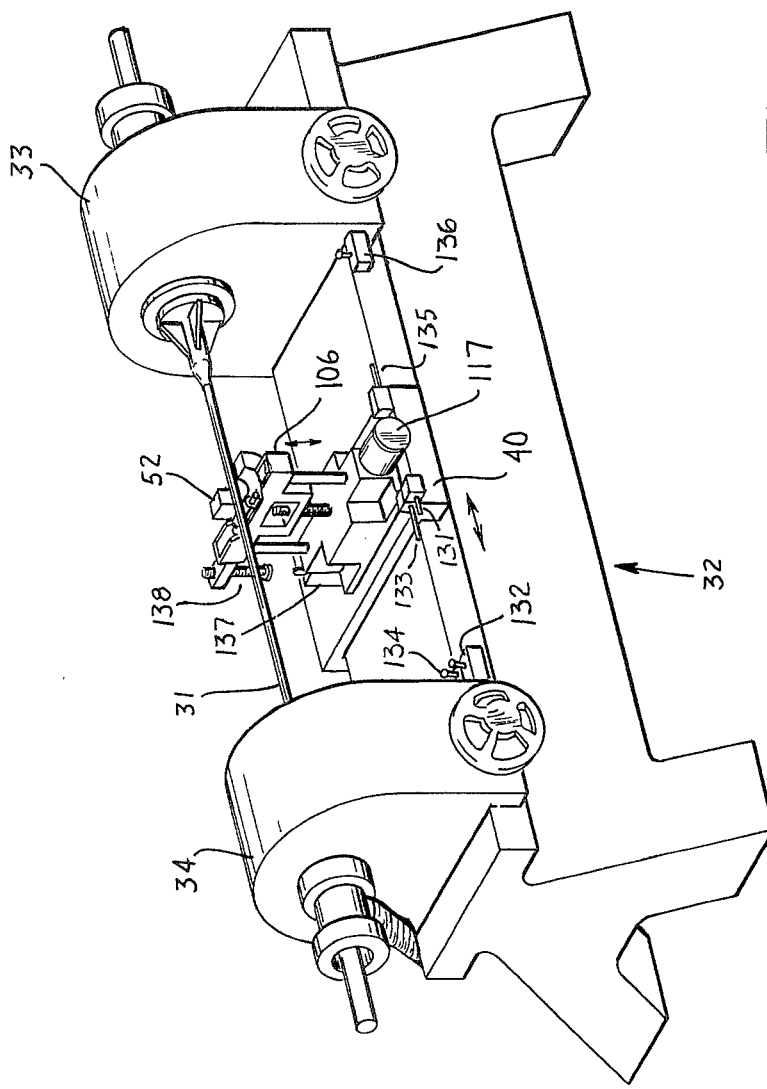
FIG. 10 is a perspective view of a lathe on which a preform tube is made and which includes a plurality of switches for controlling the operation of the collapsing device.

In a typical cycle of the collapse mode, the carriage 40 begins its travel from the tailstock 34 and an actuating finger 131 is disengaged from a limit switch 132 (see FIG. 10). As a longer actuating finger 133 of the carriage becomes disengaged from a second limit switch 134, it is deactivated, causing the roller 102 to be raised to a programmed height to engage the tube 31. Then the carriage 40 is caused to traverse the length of the tube 31. At the end of that travel, an actuating finger 135 of the carriage engages a limit switch 136 whereupon the carriage travel is discontinued and the contact roller 102 remains in engagement with the tube during a so-called "cool down" period. Afterwards, the roller 102 is caused to be lowered to a datum height whereupon an interlock limit switch 137 is activated by a finger 138 of the platform 106. This causes a high speed return of the carriage 40 to the tailstock 34 whereupon the actuating finger 131 engages the limit switch 132 to cause the movement of the carriage to be reversed and another cycle of the collapse mode to begin. On the next cycle or on predetermined subsequent cycles, the roller 102 is caused to be moved incrementally closer to the longitudinal axis 36 of the tube 31.

The engagement of the roller 102 with the tube 31 causes an impression on the outer surface of the tube. This slight impression generally takes the form of a scroll, the pitch of which is directly influenced by the rotational speed of the substrate tube and the velocity of the carriage 40. At the conclusion of the collapse process, the preform is flame-polished to remove any such contaminating marks on the outer surface.

In one example, a substrate tube from which multimode fiber was drawn had an inner diameter of 19 mm and an outer diameter of 25 mm. Following deposition, the inner diameter of the preform tube was about 17.7 mm and following collapse, the outer diameter became about 18 mm. No diminution of strength properties has been found to occur in lightguide fiber drawn from preforms which have been collapsed in accordance with the methods and apparatus of this invention.

It is to be understood that the above-described arrangements are simply illustrative of the invention. Other arrangements may be devised by those skilled in the art which will embody the principles of the invention and fall within the spirit and scope thereof.

What is claimed is:

1. A method of collapsing an elongated glass tube into a solid preform from which lightguide fiber is drawn, said method including the steps of:
    supporting each end of the tube for rotation about a longitudinal axis thereof;
    rotating the tube about the longitudinal axis by turning its supported ends; while
    exposing an outer surface of each successive increment of length of the tube to a zone of heat having a temperature profile by causing relative motion between the zone of heat and the tube; and
    causing the tube to be collapsed into a solid preform by applying continuously forces to the tube during a plurality of passes along the length thereof with said forces in each pass being applied to successive increments of length of the tube at a distance as measured along the longitudinal axis after each successive increment has been exposed to at least an initial portion of the zone of heat and with the point of application of said forces to each increment as between successive ones of the plurality of passes becoming incrementally closer to the longitudinal axis.

2. The method of claim 1, wherein the tube has a circular crosssection and is turned about a rotary path of travel, wherein the zone of heat is provided by a torch which is moved in a direction along the tube from one end of the tube toward the other in a plurality of passes and which is disposed about one portion of the rotary path of travel of the outer surface of the tube, and wherein the forces are applied along the portion of the rotary path of travel by a device which is moved in tandem with and spaced from the torch with the spatial relation of the applied forces and the zone of heat being a function of the velocity of the torch.

3. The method of claim 2, wherein a maximum temperature of the zone of heat trails a centerline of the torch, and wherein the point at which the forces are applied trails the maximum temperature of the zone of heat.

4. The method of claim 1, wherein the point of application of the forces is moved closer to the longitudinal axis at the beginning of each pass during a collapse mode for the preform tube.

5. The method of claim 1, wherein the maximum temperature of the zone of heat exceeds a temperature of about 2000° C.

6. The method of claim 1, wherein the application of forces to the elongated glass tube is accomplished with a contact device which is cooled to a temperature substantially below that of the outer surface of the glass tube in the zone of heat.

7. The method of claim 1, wherein the tube is supported with its longitudinal axis being oriented horizontally.

8. The method of claim 1, wherein the tube is supported with its longitudinal axis being oriented vertically.

9. A method of making a preform having a generally circular cross-section from a glass substrate tube having a generally circular crosssection, said method comprising the steps of:
    supporting the substrate tube at its ends for rotation about a longitudinal axis thereof;
    exposing each successive increment of length of the outer surface of the substrate tube to a zone of heat having a temperature profile and a maximum temperature within a first range by causing relative motion between the zone of heat and the substrate tube in a direction from one end of the tube to the other; while
    causing rotation of the substrate tube by turning its supported ends; and
    depositing doped reactants into the substrate tube to form a preform tube having a predetermined profile; then
    exposing each successive increment of length of the outer surface of the preform tube to a torch which provides a zone of heat having a temperature profile and a maximum temperature within a second range, that is higher than the first range, by moving the torch in a plurality of passes from one end of the preform tube to the other;

moving a contact device into engagement with the preform tube and incrementally closer to the longitudinal axis of the preform tube at the beginning of predetermined ones of the plurality of passes; and causing the preform tube to become collapsed into a solid preform about the longitudinal axis which is a substantially straight line by causing relative motion between the contact device and successive increments of length of the preform tube with the contact device being spaced from the torch a distance as measured along the longitudinal axis to cause the contact device to apply forces to each successive increment after it has been exposed to at least an initial portion of the zone of heat of the second range.

10. The method of claim 9, wherein the contact device is disengaged from the preform tube at the end of each one of the predetermined passes and reengaged at the beginning of the next predetermined pass.

11. The method of claim 9, wherein the step of causing the preform tube to be collapsed is accomplished with a contact device which is at a temperature substantially below that of the outer surface of the preform tube in the zone of heat in the second range.

12. The method of claim 9, wherein the step of supporting the preform tube also includes restraining the tube against movement in a direction along its longitudinal axis as relative motion is caused between the contact device and the preform tube.

13. The method of claim 9, wherein the zones of heat are provided by a torch which is moved in a number of passes in one direction during said step of depositing and in a direction opposite to the one direction during the step of causing the preform tube to become collapsed.

14. An apparatus for collapsing an elongated glass tube into a solid preform, said apparatus including:
means for supporting each end of the tube for rotation about a longitudinal axis thereof;
heating means for producing a zone of heat having a temperature profile;
means for causing relative motion between the tube and said heating means in a plurality of passes and in a direction along the longitudinal axis of the tube to cause each successive increment of length of the outer surface of the tube to be exposed to the zone of heat;
means for causing rotation of the tube by turning its ends;
contact means spaced from said heating means as measured along the length of the tube for causing the tube to be collapsed into a solid preform about the longitudinal axis, said contact means adapted to be in continuous engagement with the tube during each of a plurality of passes and capable of applying forces in a reproducible manner to each successive increment of length after each successive increment has been exposed to at least an initial portion of the zone of heat; and
moving means rendered effective at the beginning of predetermined passes for causing said contact means to be moved toward the longitudinal axis of the tube to cause the point of application of said forces to become incrementally closer to the longitudinal axis.

15. The apparatus of claim 14, wherein the point of application of said forces to each increment on successive occasions becomes closer to the longitudinal axis of the tube.

16. The apparatus of claim 14, wherein said moving means causes said contact means to be disengaged from the tube at the end of each predetermined pass and to be reengaged at the beginning of the next successive predetermined pass.

17. The apparatus of claim 14, wherein said contact means for applying forces to the elongated glass tube includes a surface which is at a temperature substantially below that of an outer surface of the glass tube in the zone of heat.

18. The apparatus of claim 14, wherein said heating means includes a torch assembly, said apparatus also including means for moving said torch assembly and said contact means in tandem along the glass tube with a distance between a centerline of said torch assembly and the point at which said contact means applies forces to the tube being a function of the velocity of said torch assembly.

19. An apparatus for making a solid preform having a generally circular cross-section from a glass substrate tube having a generally circular cross-section, said apparatus including:
supporting means for holding ends of the substrate tube to allow the substrate tube to be turned about a longitudinal axis thereof through a rotary path of travel;
torch means for heating the substrate tube, said means including means for directing a flow of combustible gases toward the tube to provide a zone of heat having a temperature profile and including means for providing confinement of the heat to a portion of the length of the tube and to a portion of the rotary path of travel to control the temperature along the portion of the length;
means for moving said torch means in a plurality of passes along the substrate tube to cause the zone of heat to traverse the substrate tube and to heat successive increments of the length thereof;
means for rotating the substrate tube about the longitudinal axis;
means for depositing doped reactants into the substrate tube to form a preform tube having a predetermined profile;
contact means in tandem with and spaced along the longitudinal axis from said torch means and moved therewith relative to the preform tube for collapsing the preform tube into a solid preform, said contact means being adapted to engage along the portion of the rotary path of travel each successively heated increment of the preform tube after it has been passed by a centerline of said torch means to apply forces to each increment and being adjustably mounted to permit movement inwardly and outwardly with respect to the longitudinal axis; and
means responsive to the completion of a pass of said torch along the length of the preform tube for causing said torch to be returned to one end of the preform tube and rendered effective at the beginning of predetermined passes for causing said contact means to be moved incrementally toward the longitudinal axis of the preform tube.

20. The apparatus of claim 19, wherein said torch means is moved in a first direction along the substrate tube in a number of passes to heat the tube to a temperature within a first range during deposition, and in a second direction opposite to the first when said contact means engages the tube to heat the preform tube to a temperature with a second range which is higher than the first range.

21. The apparatus of claim 20, wherein said contact means is disengaged from the preform tube at the end of each pass in the second direction and reengaged at the beginning of the next successive pass.

22. The apparatus of claim 19, wherein said contact means engages each successive increment of length of predetermined distance after a reference point thereof has been passed by a centerline of said torch means.

23. The apparatus of claim 19, wherein said contact means is a rotatably mounted member with its axis of rotation being transverse to the longitudinal axis of the preform tube.

24. The apparatus of claim 23, wherein said member is a roller which is made of graphite.

25. The apparatus of claim 24, wherein said roller has a temperature substantially below that of an outer surface of the preform tube.

26. The apparatus of claim 19, wherein said supporting means includes means for restraining the tube against movement in a direction along its longitudinal axis as said contact means causes forces to be applied to the preform tube.

* * * * *